April 26, 1960 N. S. SATTER 2,934,060
APPARATUS AND METHOD FOR CONDITIONING RESPIRATION
Filed May 26, 1955
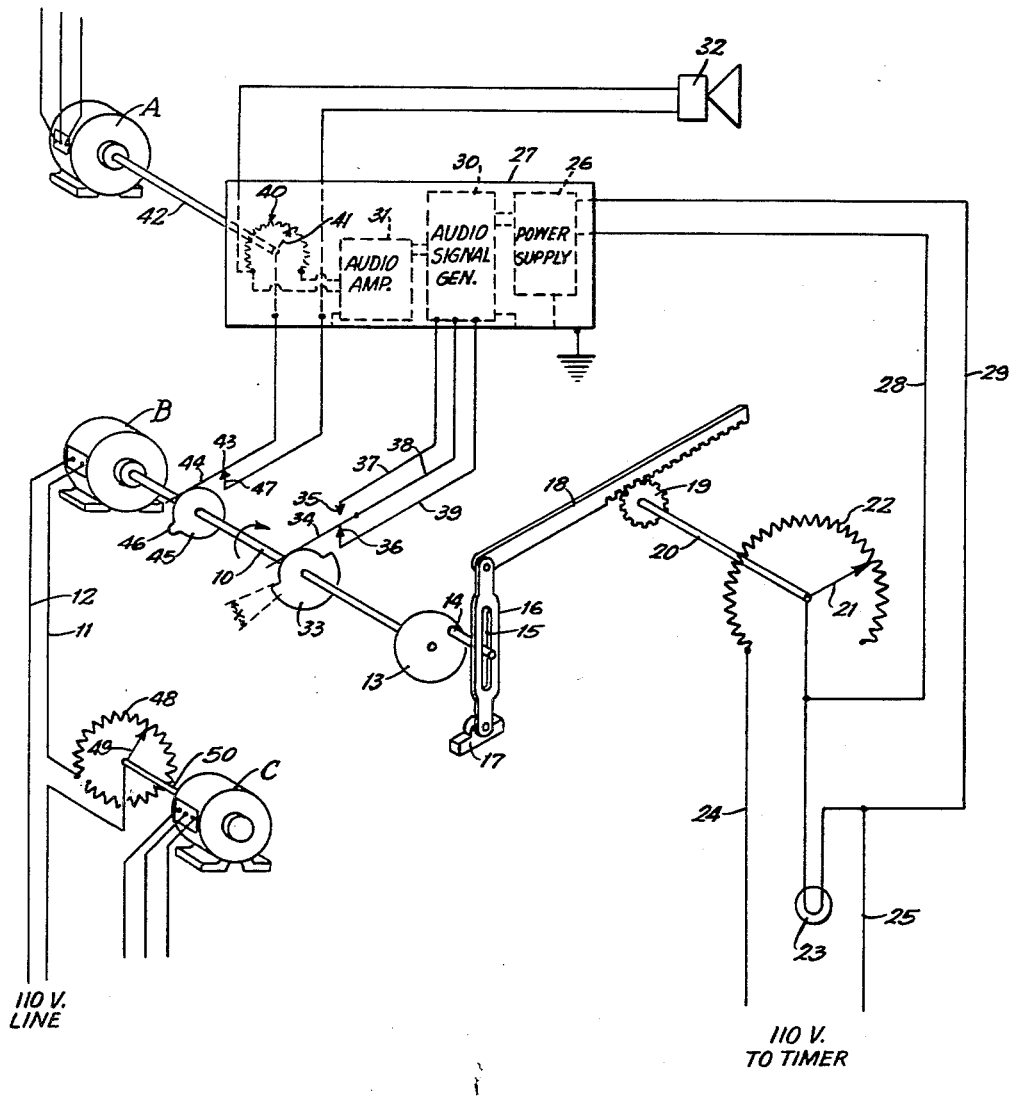
INVENTOR:
Neil S. Satter,
BY
Dawson, Tilton & Graham,
ATTORNEYS.

# United States Patent Office 2,934,060
Patented Apr. 26, 1960

2,934,060

APPARATUS AND METHOD FOR CONDITIONING RESPIRATION

Neil S. Satter, Chicago, Ill.

Application May 26, 1955, Serial No. 511,257

11 Claims. (Cl. 128—1)

This invention relates to an apparatus and method for conditioning respiration, and more specifically to an apparatus and method for conditioning the respiration of a human subject who is capable of receiving and responding to external sensory stimuli, so that the subject may be directed into a state of relaxation. The present invention is particularly useful in guiding a subject into a condition which is characterized by the individual's increased responsiveness to suggestions made either by himself or by others, and which is frequently referred to as a state of hypersuggestability.

It is a well known and easily demonstrated fact that the breathing rates of all animal forms, including human beings, are increased during periods of excitement and exertion and are decreased at times of relaxation and rest. In the case of human respiration, breathing rates vary from about ten inspiration and expiration cycles per minute during normal sleep to fifty or more cycles per minute during periods of extreme physical activity. A human being in a reclining position and in an awake and relaxed condition is generally found to have a normal breathing rate of about fifteen to twenty cycles per minute. While a detailed explanation of the physiology of respiration is believed unnecessary herein, it is to be noted that the automatic variations in breathing rates is related to the amounts of carbon dioxide dispatched by body cells into the blood stream and carried by the blood to the "respiration center" of the brain, which in turn responds by increasing or retarding the respiratory rate.

Although it is apparent that a subject's breathing rate is normally reduced during periods of inactivity, no method has heretofore been known for guiding a subject into a state of sleep involuntarily or unconsciously by reducing the respiration rate of that subject. Accordingly, one of the main objects of this invention is to provide an apparatus and a method for conditioning the respiration of a subject capable of receiving sensory impressions from at least one repetitiously occurring signal. Another object is to provide a method and an apparatus for conditioning the respiration of a human subject in order to produce a state of hypersuggestability therein, the apparatus providing at least one repetitiously occurring sensory stimulus synchronized to the breathing rate of the subject.

A further object is to provide a method useful for changing the respiration rate of a subject from that of a normal rate during wakefulness to that of a normal rate during sleep by synchronizing at least one repetitious or pulsating signal with the subject's breathing rate in order to condition the respiration rate of that subject, and progressively reducing the frequency of the signal until it corresponds with the frequency of respiration of the subject during normal sleep. A still further object is to provide an apparatus which produces at least one repetitiously occurring signal of diminishing frequency adapted to condition the respiratory rate of a subject for the purpose of inducing a state of relaxation therein and for directing the subject into a hypersuggestive state.

An additional object is to provide an apparatus adapted to emit audio and visual signals, the audio signal being repetitious and having progressively decreasing frequency in synchronization with the frequency of the visual signal.

Other objects will appear from the specification and drawing. The drawing is a perspective, expanded and partly diagrammatic view of an apparatus embodying the present invention.

As shown in the drawing, the apparatus is operated by motors A, B and C, which are preferably of the electric type and are adapted to operate on alternating current supplied from a 110 volt power source. While three motors are shown, it is evident that a single motor coupled with a suitable gear reduction apparatus might be used to provide the desired results. Most desirably, motors A and C are each wound for reversible operation, as will be explained shortly.

Motor B is equipped with a shaft 10 which is rotatable in a clockwise direction, as represented in the drawing, at speeds ranging from 10 to 20 revolutions per minute, depending upon the amount of current passing to motor B through ilnes 11 and 12. Adjacent the end of the shaft 10 opposite from motor B is mounted a plate 13 which carries an eccentric pin 14. The pin reciprocates in a slot 15 provided by an arm 16 which is pivotally mounted at its lower portion to a fixed member 17, so that upon rotation of the shaft and the eccentric crank pin, the arm pivots about its attachment in a plane perpendicular to the axis of the shaft. Rotation of the shaft 10 thereby produces alternating or continuously reversing movement by the upper portion of arm 16. The upper portion of the arm is pivotally secured to a rack 18 which engages the geared wheel 19 carried by shaft 20. At the opposite end of the shaft 20 is mounted an adjustable tap 21 of a rheostat 22.

The rheostat is connected in circuit with the light source 23 which in turn is connected in parallel circuit to a 110 volt A.C. source by leads 24 and 25. These leads may extend through a timer (not shown) for interrupting the current at the expiration of a predetermined period.

A power supply or power pack 26 shown diagrammatically within box 27 is connected in parallel circuit with the light source 23 by leads 28 and 29. The power supply is completely conventional and has a rectifier and filter to provide a direct current source for the audio signal generators 30 and audio amplifiers 31. Since these units are conventional and well-known in the art, a detailed description herein is believed unnecessary.

For particularly effective operation of my apparatus, I have found it desirable to provide two distinct audio signals of different tones or frequencies. Conventional audio signal generators available in most radio equipment stores may be used. I prefer to use generators which produce tones of middle C and E flat, although generators emitting different notes might be used to produce satisfactory results.

While a number of different arrangements might be used for alternately feeding each of the two audio signals to a speaker 32, as for example, electronic control devices, I have found that a simple and an effective way to achieve that end is to mount a cam 33 on the shaft 10 and to provide a cam follower 34 adapted to ride upon the cam. As shaft 10 is rotated by motor B, the cam follower 34 alternately engages switch contacts 35 and 36 which are arranged in circuit with the respective audio signal generators by leads 37, 38 and 39. When the parts are in the position shown, the cam follower or switch engages the reduced portion of the cam and the circuit defined by leads 38 and 39 is completed, so that one of the generators is actuated and a tone, such as middle C, is emitted by the speaker when the cam follower engages the enlarged surface of the cam to close the circuit provided by leads 37 and 38.

The signals produced by the generators are fed through an audio amplifier 31, which in turn transmits the signals to speaker 32. This audio amplifier is conventional and is commercially available as a unit.

In order to produce satisfactory results, it is necessary to insulate the cam follower 34 from cam 33. These parts may be effectively insulated by fabricating cam 33 from a non-conductive material such as fiber, or non-conductive plastics.

For progressively reducing the volume of the audible signal emitted by the speaker 32 over a predetermined length of time, a rheostat 40 is connected to the amplifier unit 31. The adjustable element or tap 41 of the rheostat is mounted upon a shaft 42 which is slowly driven by the motor A so that the intensity of the audio signal delivered to the speaker is gradually reduced and becomes inaudible at the end of a predetermined period, preferably a period of about twenty minutes.

For a short period in each cycle of alternating tone signals, it has been found effective to have no sound emanating from the speaker at all. A switch is, therefore, connected in series with the rheostat 40 and functions to complete or interrupt the circuit therethrough. The switch has a movable switch arm 43 with a cam follower portion 44 that rides on cam 45. When the protuberance 46 of cam 45 engages the cam follower, arm 43 is disconnected from contact 47 and the speaker circuit is broken. Like the cam 33, the circuit-breaking cam 45 is preferably formed of a non-conductive material, such as a fibrous or plastic material.

It is believed evident from the drawing and from the above description that the cyclic rate of the alternating tone signals emitted from the speaker 32 depends upon the speed at which the cams 33 and 45 are rotated by motor B. The rotational speed of motor B within the range of about 10 to 20 revolutions per minute is in turn governed by the amount of current carried by leads 11 and 12. As shown in the drawing, the motor B is connected in series to a rheostat 48 which is equipped with an adjustable tap 49 mounted upon the shaft 50 of motor C. The adjustment of rheostat 48, therefore, determines the amount of current carried to motor B, and controls the rotational speed of that motor. I prefer to progressively and gradually diminish the rotational speed of motor B from 20 to 10 revolutions per minute over a predetermined period of about twenty minutes. In order to achieve this result, motor C should therefore be adapted to rotate shaft 50 at about $\frac{1}{20}$ of a revolution per minute so that tap 49 imposes maximum resistance in the circuit at the expiration of a period of about twenty minutes.

In the operation of my apparatus, a reversible motor C is adjusted so that rheostat 48 provides little or no resistance in the 110 volt A.C. circuit carrying electricity to motor B. Shaft 10 is therefore rotated by motor B at a speed of about 20 revolutions per minute. This initial rotational speed is gradually diminished by the progressively increasing resistance provided by rheostat 48 which is operated by motor C. As a result, shaft 10 and cams 45 and 33 are rotated at about 10 revolutions per minute at the expiration of a twenty minute period.

As shaft 10 is rotated, rack 18 is driven back and forth to increase and decrease the resistance imposed by rheostat 22 in the audio-visual signal circuit supplied with electricity through leads 24 and 25. This variation in resistance produced by movement of gear wheel 19, shaft 20 and tap 21 causes the signals emitted from the sound and light sources 32 and 23, respectively, to increase and decrease in intensity. Since the light and sound sources are part of the same circuit, their repetitious intensity cycles are in synchronization. Therefore, the signals emitted by both the speaker 32 and light 23 increase and diminish in intensity together at a frequency of about 20 cycles per minute during the initial operation of my apparatus. When the rotational speed of motor B has decreased to 10 revolutions per minute at the end of a twenty minute period, the simultaneous variation in the intensity of the signals is correspondingly reduced to 10 cycles per minute.

The apparatus not only produces audible signals of periodically varying intensities, but alternately emits different tones during the increasing and decreasing portions of the intensity cycles; as cam 33 rotates, the cam rider alternately engages contact 35 and contact 36, thereby successively activating different audio signal generators. One tone, such as E flat, is emitted by the speaker as the sound signal increases in intensity, and an alternate tone, such as middle C, is emitted by the speaker as the sound intensity of the signal decreases.

I have found that the inhalation and exhalation periods of human respiration are of different duration. More specifically, the inspiration portions of human respiratory cycles are slightly shorter in duration than the expiration portions of those cycles. Moreover, between successive cycles there are normally short pauses of a duration directly related to the rate of respiration of a subject. In order to provide a repetitious tone signal which closely corresponds to the periodic breathing cycles of a subject, I therefore provide cam 45 with a protuberance having a radial dimension of 20° which renders a 20° segment of cam 33 ineffective for actuating the audio generators and producing a sound signal. This segment is shown in the drawing by dotted lines and is indicated by an "x." The enlarged portion of cam 33 covering a 180° arc corresponds to the expiration portion of a subject's respiration cycle, while the reduced portion of the cam extending 160° thereabout represents the inspiration portion of the cycle.

Therefore, as the motor B rotates shaft 10, the intensity of both the light and the sound signals repetitiously increases and decreases. At the same time, the speaker emits one tone during the increasing intensity periods when cam rider 34 engages contact 36 and produces a different tone during decreasing intensity periods when the cam rider connects with contact 35. In addition, the decreasing periods of sound intensity are slightly longer than the increasing intensity periods, and successive intensity cycles are briefly interrupted.

Over a twenty minute period the cyclic frequency of the audible and visible signals decreases from about 20 cycles per minute to about 10 cycles per minute. At the same time, I prefer to progressively diminish the volume of the sound signals so that at the expiration of the twenty minute period, no sound is emitted from the speaker. This is accomplished by the rheostat 40 in conjunction with motor A, by which the resistance in the audio signal circuit is gradually increased during the operational period.

In order to condition respiration by means of the apparatus of the present invention, the apparatus must be positioned so that a subject may receive the signals emitted by the speaker and the light. Preferably, the subject should assume a comfortable reclining position facing the light source. The tone signals may be presented to the subject through any suitable speaker, although I have found that earphones are particularly effective.

Next, the cycles of increasing and decreasing signal intensity must be synchronized with the respiratory rate of the subject. To facilitate this synchronization, I have found it helpful to approximate the subject's breathing rate in corresponding signal frequencies by adjusting motor C and rheostat 48 so that motor B rotates at a speed sufficient to produce signal frequencies of about 20 cycles per minute, and then directing the subject to inhale when the light increases in intensity and to exhale when it decreases in intensity. After the short interval, the repetitious intensity variations of the signals condition the respiration of the subject so that without conscious effort the subject breathes in harmony with the intensity cycles of the sensory stimuli.

At the same time, the repetitiously occurring cycles of signal intensity are progressively diminished in frequency. This reduction of frequency of the signal intensity cycles is continued until the signal frequency (respiration rate of the subject) corresponds to the breathing rate of the subject in a state of normal sleep. It has been found that when these cyclic frequencies are reduced over a twenty minute period to about 10 cycles per minute, the subject has been conditioned to breathe at a rate normally occurring during sleep, and is either asleep or in a lethargic relaxed and restful state neighboring on sleep. By that time, the tone signal has been decreased in volume and has become barely audible.

It is known that in the fringe area between sleep and wakefulness, human beings are especially susceptible to suggestion. This condition is frequently referred to as a state of hypersuggestability. It is apparent that by conditioning the respiration of a subject, and thereafter reducing that rate of respiration to coincide with the breathing rate during normal sleep, a subject is thereby directed or guided into a state in which he is particularly amenable to suggestions. The suggestions may be offered by others or may be presented by the subject himself, as for instance, by continuous repetition of the suggestion by the subject during the conditioning process and until the subject is overcome by sleep.

While the foregoing specification has set forth my apparatus and method for conditioning respiration in considerable detail for purposes of illustration, it will be recognized by those skilled in the art that many of these details may be varied considerably without departing from the scope and spirit of my invention.

I claim:

1. An apparatus for conditioning the respiration of a subject comprising at least one signal source for emitting a signal adapted to be sensed by a subject, control means operably connected to said source for repetitiously increasing and decreasing the intensity of said signal, and means operably connected to said control means for gradually and automatically reducing the frequency of the increasing and decreasing intensity cycles of said signal from a given starting frequency to a preselected lower frequency.

2. The structure of claim 1 in which said signal source provides a visible light signal.

3. The structure of claim 1 in which said signal source provides an audible sound signal.

4. The structure of claim 3 in which said signal source is capable of successively emitting sounds of two different tones, said control means including means for actuating said signal source to emit sounds of different tones for the increasing and decreasing intensity cycles respectively.

5. In a signal apparatus of the type described, a first signal source adapted to emit an audible signal, a second signal source providing a visible signal, control means cooperating with said first and second signal sources for periodically and simultaneously varying the intensities of the signals emitted by said sources, and means cooperating with said control means for gradually and automatically reducing the frequency of the intensity cycles of said signals from a given starting frequency to a preselected lower frequency.

6. In an apparatus for conditioning the respiration of a human subject and for directing that subject into a hypersuggestive state, a light source adapted to emit a visible light signal, a sound source adapted to provide an audible signal, control means cooperating with said light and sound sources for repetitiously and simultaneously varying the intensities of said signals, and means cooperating with said control means for gradually and automatically reducing the frequency of the increasing decreasing intensity cycles of said signals from a given starting frequency to a preselected lower frequency.

7. The structure of claim 6 in which said sound source is capable of emitting sounds of two different tones, said control means including means for actuating said sound source to emit sounds of different tones for the increasing and decreasing intensity cycles respectively.

8. In an electrical signal apparatus for producing signals adapted to condition the respiratory rate of a human subject capable of receiving said signals, an electric light source for providing a visible signal, an electrical sound source for emitting an audible signal, electrical control means for repetitiously increasing and decreasing the amount of electrical current passing to both of said sources, and an electrical synchronizing device in circuit with said control means adapted to reduce the amount of current passing through said control means for automatically reducing the rate at which said control means diminishes and increases the amount of electrical current passing through said signal sources.

9. The structure of claim 8 in which said control means comprises a rheostat in circuit with both of said signal sources and a motor cooperating with said rheostat for periodically increasing and decreasing the resistance produced thereby.

10. The structure of claim 9 in which said synchronizing device comprises a rheostat arranged in circuit with said motor for varying the amount of current passing to said motor and for varying the speed thereof, and motor means for progressively adjusting said rheostat to reduce the amount of current passing to said motor.

11. The structure of claim 9 in which said control means also provides a switch in circuit with said sound source for periodically interrupting the passage of current to said sound source.

References Cited in the file of this patent

UNITED STATES PATENTS 2,304,095    Hull                   Dec. 8, 1942

FOREIGN PATENTS 670,789    Great Britain          Apr. 23, 1952